US011726554B2

(12) United States Patent
Aslandere et al.

(10) Patent No.: US 11,726,554 B2
(45) Date of Patent: Aug. 15, 2023

(54) COMPUTER-IMPLEMENTED SIMULATION OF A VIRTUAL HAND

(71) Applicant: Ford Global Technologies, LLC, Dearborn, MI (US)

(72) Inventors: Turgay Isik Aslandere, Aachen/NRW (DE); Cem Mengi, Aachen/NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/403,979

(22) Filed: Aug. 17, 2021

(65) Prior Publication Data

US 2022/0057857 A1 Feb. 24, 2022

(30) Foreign Application Priority Data

Aug. 21, 2020 (DE) .......................... 102020121937.7

(51) Int. Cl.
*G06F 3/01* (2006.01)
*G06T 17/00* (2006.01)
*G06N 3/08* (2023.01)
*G06N 3/044* (2023.01)

(52) U.S. Cl.
CPC .............. *G06F 3/011* (2013.01); *G06F 3/016* (2013.01); *G06N 3/044* (2023.01); *G06N 3/08* (2013.01); *G06T 17/00* (2013.01)

(58) Field of Classification Search
CPC ........ G06F 3/011; G06F 3/016; G06F 3/0425; G06F 3/0421; G06N 3/08; G06N 3/0445; G06N 3/0454; G06N 3/084; G06N 3/04; G06T 17/00; G06T 7/70; G06T 2207/20072; G06T 2207/20081; G06T 2207/10012; G06T 2207/20084; G06T 7/254; G06T 7/73
See application file for complete search history.

(56) References Cited

U.S. PATENT DOCUMENTS

| | | | |
|---|---|---|---|
| 9,552,673 B2 | 1/2017 | Hilliges et al. | |
| 10,416,824 B2 | 9/2019 | Choi et al. | |
| 10,416,834 B1 | 9/2019 | Holz et al. | |
| 2014/0104274 A1* | 4/2014 | Hilliges | .................. G06F 3/017 |
| | | | 345/424 |
| 2019/0122373 A1* | 4/2019 | Natroshvili | .......... G06V 10/454 |

(Continued)

FOREIGN PATENT DOCUMENTS

GB 2573091 A 10/2019
WO 2019082853 A1 5/2019

OTHER PUBLICATIONS

DE Examination Report dated May 28, 2021 re Appl. No. 102020121937.7.

(Continued)

*Primary Examiner* — Grant Sitta
(74) *Attorney, Agent, or Firm* — Brandon Hicks; Bejin Bieneman PLC

(57) ABSTRACT

A computer-implemented simulation of a virtual hand in a virtual environment can include reading in a hand dataset that is representative of a shape of a real hand of a user, applying the hand dataset to a trained, artificial neural network, and determining an output dataset with the artificial neural network to which the dataset has been applied indicative of forces acting on a virtual object.

10 Claims, 3 Drawing Sheets

(56) References Cited

U.S. PATENT DOCUMENTS

2020/0225761 A1* 7/2020 Sinha ................... G06N 20/00
2021/0004146 A1* 1/2021 Linville ............... G06F 3/0304

OTHER PUBLICATIONS

Borst et al., "Realistic Virtual Grasping", VR '05 Proceedings of the 2005 IEEE Conference 2005 on Virtual Reality, Mar. 2005; https://doi.org/10.1109/VR.2005.65 (Abstract Only).
Bowman et al., "3D User Interfaces: Theory and Practice", Copyright Addison-Wesley Professional, ISBN-13: 9780133390568.
Fahn et al., "Development of a Sensory Data Glove Using Neural-Network-Based Calibration", JCAT 2000.
Hochreiter et al., "Long Short-term Memory", Article in Neural Computation Dec. 1997, DOI: 10 1162/eco. 1997.9.8.1735—Source: PubMed.
Wikipedia, "Artificial neural network".
Yang et al., "Haptic Rendering of Virtual Hand Moving Objects", 2011 International Conference on Cyberworlds.

* cited by examiner

COMPUTER-IMPLEMENTED SIMULATION OF A VIRTUAL HAND

CROSS-REFERENCE TO RELATED APPLICATION

This patent application claims priority to German Application No. DE 102020121937.7, filed on Aug. 21, 2020, which is hereby incorporated by reference in its entirety.

FIELD

The present document relates to a computer-implemented simulation of a virtual hand in a virtual environment.

BACKGROUND

The display and simultaneous perception of reality and its physical properties in an interactive virtual environment that is generated in real time by computer is referred to as virtual reality, abbreviated to VR.

Special output equipment such as, for example, virtual reality headsets are used for the display of the virtual environment to generate a feeling of immersion. Two images are generated and displayed from different perspectives (stereo projection) in order to convey an impression of space.

Special input equipment known as tracking systems are required for interaction with the virtual world. Such tracking systems can capture and evaluate infra-red signals in order to determine position and movement data that are indicative of a head, a hand or of the fingers of the hand of a user.

Some output equipment conveys force feedback to the hands or other bodily parts of the user, so that the user can orient themselves in the virtual environment through the haptics and sensor technology as a further sensory perception.

Software developed specially for this purpose is also necessary for the generation of a virtual environment. The software must be able to calculate complex, three-dimensional worlds in real time, i.e., with at least 25 images per second, in stereo, separately for the left and right eyes of the user. This value varies according to the application—a driving simulation, for example, requires at least 60 images per second in order not to create nausea (simulator sickness).

Interactions with virtual objects in the virtual environment are also necessary. One of the usual and natural methods for interacting with the virtual objects is simulation of a virtual hand.

Interactions in which a virtual hand works together with a virtual object are, however, difficult to implement, in particular if the virtual object is not represented by a physical object or mock-up. An accurate calculation of the handling forces is used to manipulate and handle virtual objects of this sort. A number of methods are known for determining the forces between a virtual hand and a virtual object. These are mostly based on rigid body physics. Application of rigid body physics in virtual environments, however, does not always deliver usable results, because force feedback to the real hand is either absent or inadequate. If, for example, a distance between the (virtual and real) fingers of a hand is zero, then the application of rigid body physics leads to an infinitely large force that acts on the virtual object. In a real scenario this cannot happen if the object is a rigid object.

Further methods for the computer-implemented simulation of a virtual hand in a virtual environment, in which forces acting on virtual objects in a virtual environment are determined, and the hand shape of the user is captured and evaluated, are known, for example, from U.S. Pat. No. 10,416,824 B1, 9,552,673 B2 and WO 2019/082853 A1.

Giving force feedback to a user is known from GB 2573091 A.

There is a need to indicate ways in which a method for the computer-implemented simulation of a virtual hand in a virtual environment can be improved.

SUMMARY

The present computer-implemented simulation of a virtual hand in a virtual environment includes:

reading in a hand dataset that is representative of a shape of a real hand of a user, applying the hand dataset to a trained, artificial neural network, and determining an output dataset with the artificial neural network to which the dataset has been applied indicative of acting forces with the artificial neural network to which the dataset has been applied.

In other words, the use of a trained, artificial neural network is proposed instead of an analytic approach.

Artificial neural networks (abbreviated to ANN) are networks of artificial neurons. These neurons (or node points) of an artificial neural network are arranged in layers, and are usually connected to one another in a fixed hierarchy. The neurons are typically connected between two layers, but also, less often, within one layer.

Such an artificial neural network is trained during a training phase before being brought into operation. The artificial neural network is modified during the training phase, so that it creates associated output patterns for specific input patterns. This can take place by means of supervised learning, unsupervised learning, reinforcing learning or stochastic learning.

The use of a trained artificial neural network here offers the advantage of profiting from its ability to learn, its parallel operation, its fault tolerance, and its robustness in regard of malfunctions.

According to one embodiment, a reaction force dataset indicative of reaction forces of a virtual object is determined in a further step, and the virtual object is displaced in accordance with the reaction force dataset in a further step. In other words, a virtual object is thus moved analogously in the virtual environment. The immersion can thus be further improved.

According to a further embodiment a feedback dataset for feedback based on the reaction force dataset is determined in a further step, and the feedback dataset is transmitted to a haptic feedback device in a further step. In other words, a user thus receives feedback from a virtual object that he is moving in the virtual environment. The immersion can thus be improved again.

According to a further embodiment, the artificial neural network is trained with training datasets based on measurement data. The training datasets are based on values captured with a tracking system. Values that are determined in the real world are thus used. The artificial neural network is thus trained to replicate events in the real world. In addition, training datasets of an artificial nature, i.e., that are based on simulations, can also be used. The training datasets of an artificial nature can, for example, be based on modifications of the training datasets based on measurement data. The database for training the artificial neural network can thus be broadened.

According to a further embodiment, a recurrent convolutional neural network (R-CNN) is used as the artificial neural network. Fundamentally, the structure of a classic convolutional neural network (CNN) consists of one or a plurality of convolutional layers, followed by a pooling layer. Artificial neural networks that, in contrast to feedforward neural networks, are characterized by connections from neurons of one layer to neurons of the same or to a preceding layer, are referred to as recurrent neural networks (RNN). An artificial neural network in which at least one convolutional neural network is provided at the input side, followed by at least one recurrent neural network, is referred to here as a recurrent convolutional neural network.

According to a further embodiment, the artificial neural network comprises a double many-to-many architecture. In other words, the artificial neural network comprises a plurality of inputs and a plurality of outputs. Multidimensional input datasets can thus be read in, and multidimensional output datasets can be provided.

According to a further embodiment the artificial neural network comprises a long short-term memory (LSTM). Such a long short-term memory improves the training. Error gradient descent methods are used when training artificial neural networks, and can be imagined as the way a mountaineer searches for the lowest valley. This may fall short for deep, multilayer artificial neural networks. The long short-term memory provides additional information that counteracts ineffective weighting updating and, so to speak, extends the search radius when training.

A computer program product and a system for computer-implemented simulation also are included in this disclosure.

BRIEF SUMMARY OF THE DRAWINGS

The disclosure will now be explained with reference to drawings, in which.

DESCRIPTION

Figure 1:
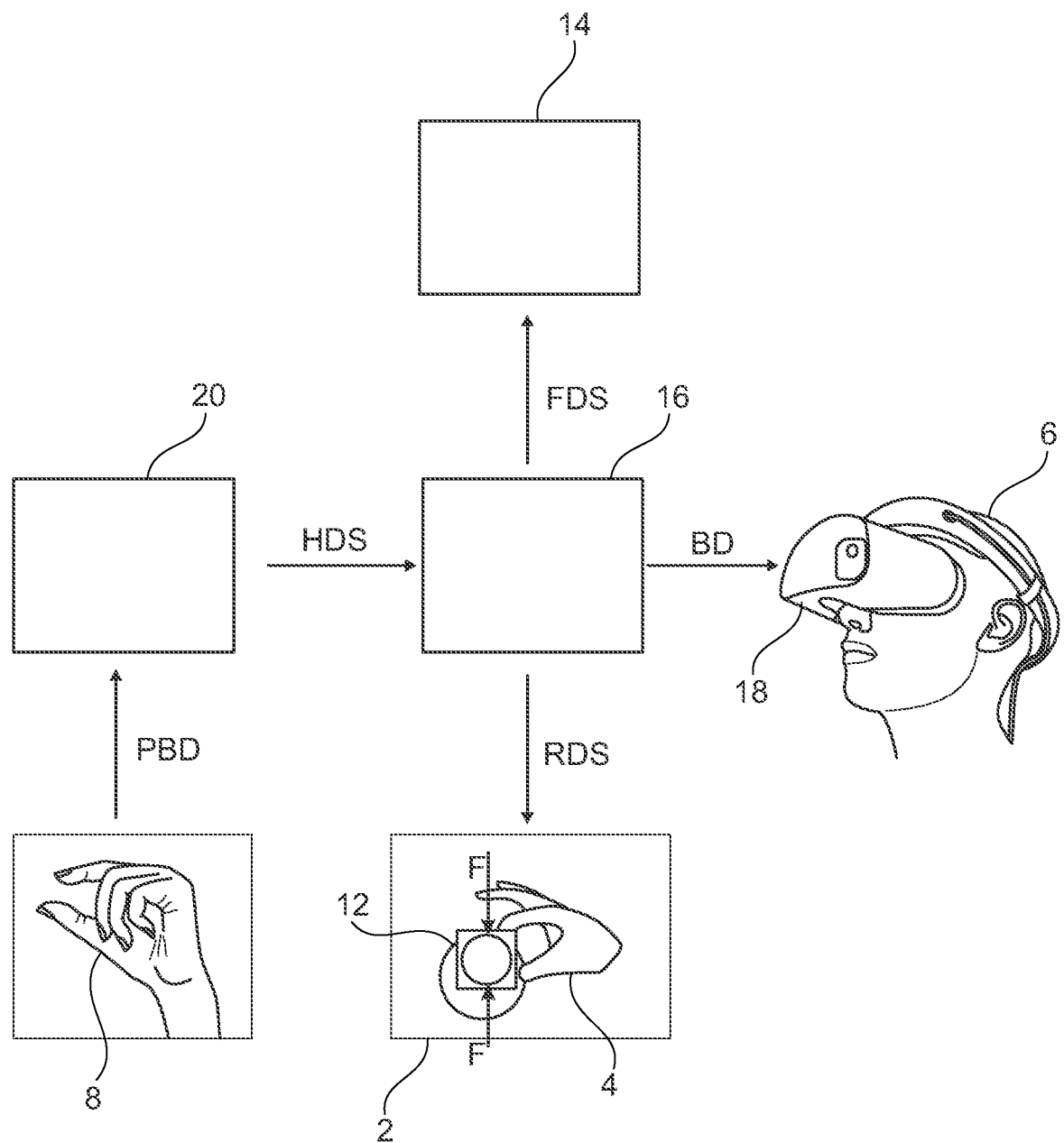
FIG. 1 shows a schematic illustration of a scenario in which a virtual hand is simulated in a virtual environment in the course of a computer-implemented simulation.

Reference is first made to FIG. 1.

A scenario is illustrated in which a user 6 carries out an interaction with a virtual object 12 in a virtual environment 2. In the present exemplary embodiment, the user 6 grasps the virtual object 12 with his virtual hand 4.

A system 16 that is connected for data exchange with an HMI 18 that the user 8 wears on his head, and is designed in the present exemplary embodiment as a head-mounted display, is provided to generate the virtual environment 2.

The system 16 is designed to provide image data BD that are then visually displayed to the user 8 by the HMI 18 on the basis of the virtual environment 2, taking the current direction of view of the user 8 into consideration.

The system 16 is further designed to read in data from a tracking device 20. The tracking device 20 is designed to capture position and movement data PBD, for example indicative of a head, a hand and/or of fingers of the user 6 in the real environment, and to provide them to the system 16 in the form of a hand dataset HDS. In the present exemplary embodiment, the tracking device 20 acquires infra-red signals of a real hand 8 of the user 6 for this purpose.

The system 16 is further designed to generate a feedback dataset FDS and to transmit it to a haptic feedback device 14. The haptic feedback device 14 comprises one or a plurality of actuators (not illustrated) in order to give haptic feedback to the user 6 during his interactions.

The system 16 and the components referred to can comprise hardware and/or software components for this purpose and for the tasks and functions described below.

It should be noted that in the present scenario, the user 6 grasps the virtual object 12 with his virtual hand 4 in the virtual environment 2, but that a real object analogous to the virtual object 12 is not present.

In the present exemplary embodiment there is thus no feedback force to the real hand 8. If, for example, a distance between the fingers of the real hand 8 is zero, application of rigid body physics leads here to an infinitely large force that would act on the virtual object 12. This cannot, however, happen in a real scenario.

Figure 2:
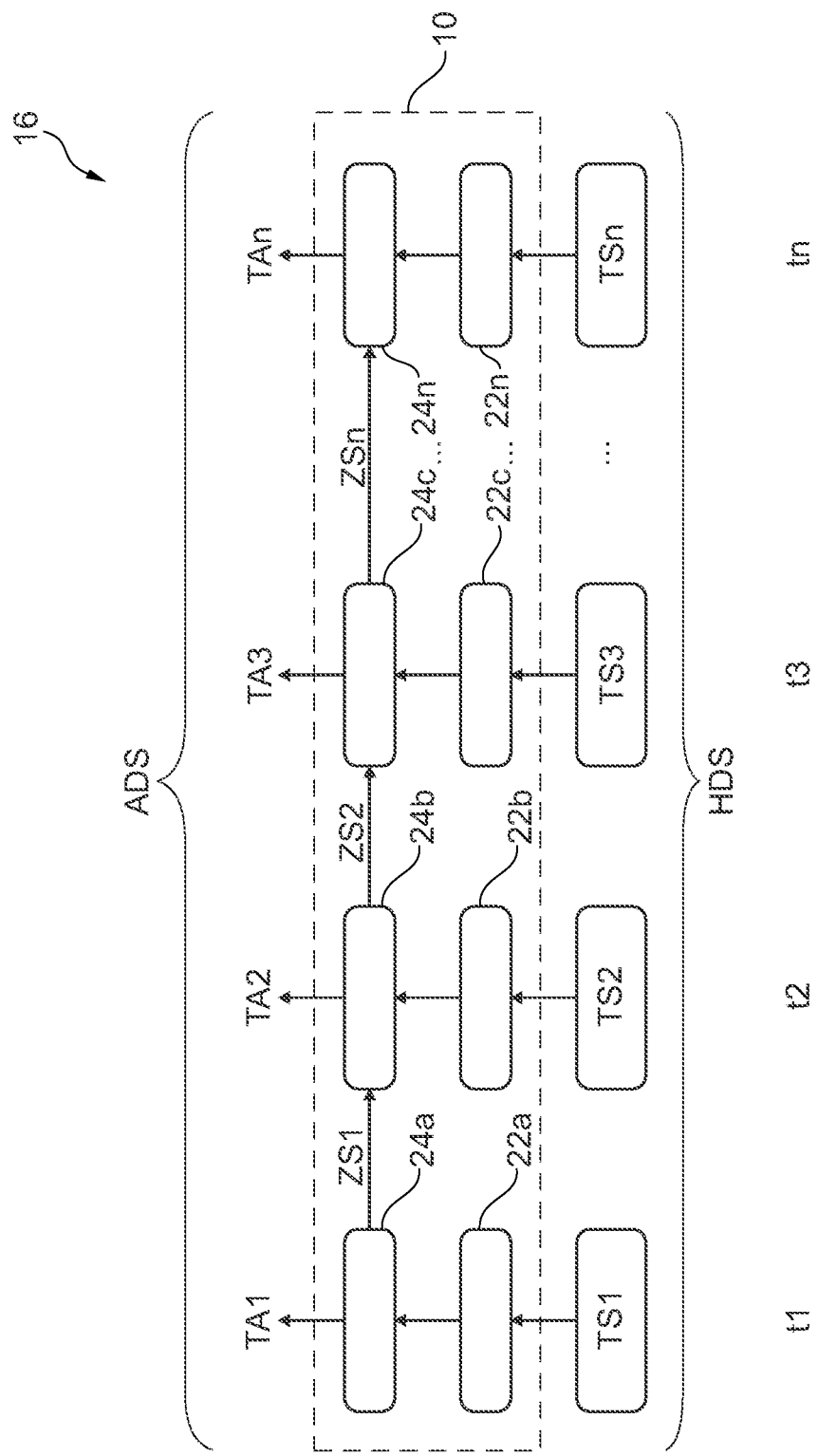
FIG. 2 shows a schematic illustration of the components of a system for such a simulation.

In order to be able also to manage these kinds of scenarios in a computer-implemented simulation of the virtual hand 4 in the virtual environment 2, a development of the system 16 is now explained with additional reference to FIG. 2.

The system 16 comprises a trained, artificial neural network 10 to which the hand dataset HDS can be applied and which then provides an output dataset ADS indicative of the forces acting on the virtual object 12.

The hand dataset HDS can, for example, be present in the form of an image dataset and comprise a plurality of temporally sequential partial input datasets TS1, TS2, TS3, ... TSn, each of which is indicative of a hand shape of the real hand 8 at a specific time point t1, t2, t3, ... tn. In other words the hand dataset HDS can be conceived of as a type of film or even as a 4D dataset.

The output dataset ADS can, for example, be present in the form of an array with a plurality of temporally sequential partial output datasets TA1, TA2, TA3, ... TAn, each of which is indicative of a force acting on the virtual object 12 at a specific time point t1, t2, t3, ... tn.

The artificial neural network 10 can, in other words, be conceived of as having a many-to-many architecture.

The artificial neural network 10 can furthermore be conceived of as a recurrent convolutional neural network. In an input level the artificial neural network 10 comprises a plurality of convolutional neural networks 22a, 22b, 22c, ... 22n and, in a subsequent level, a plurality of recurrent neural networks 24a, 24b, 24c, ... 24n each, in the present exemplary embodiment, with a long short-term memory.

After the artificial neural network 10 has been trained in the course of a training phase, a respective partial input dataset TS1, TS2, TS3, ... TSn is applied to respectively one of the plurality of convolutional neural networks 22a, 22b, 22c, ... 22n.

Each of the plurality of convolutional neural networks 22a, 22b, 22c, ... 22n further provides an intermediate dataset ZS1, ZS2, ZS3, ... ZSn as an output, which is then applied to each associated recurrent neural network 24a, 24b, 24c, ... 24n corresponding to the subsequent time point t1, t2, t3, ... tn.

Each of the recurrent neural networks 24a, 24b, 24c, ... 24n then provides the partial output datasets TA1, TA2, TA3, ... TAn.

Each of the recurrent neural networks 24a, 24b, 24c further provides a transmission dataset UD1, UD2, US3 that is transmitted to and evaluated in the recurrent neural network 24b, 24c, . . . 24n that is assigned to the respective subsequent time point t2, t3, . . . tn. In other words, the artificial neural network 10 is designed as a unidirectional recurrent neural network.

Varying from the present exemplary embodiment, the artificial neural network 10 can also be designed as a bidirectional recurrent neural network (BRNN).

Bidirectional recurring neural networks connect two hidden layers in the opposing direction to the same output. With this form of training, the output layer can simultaneously receive information from previous (reverse) and future (forward) states. The quantity of input information available to the artificial neural network can thus be increased. Bidirectional recurring neural networks allow a context of the input data to be taken into consideration. In bidirectional recurring neural networks, the neurons of a regular recurrent neural network are split into two directions, one for the positive time direction (forward states) and one for the negative time direction (reverse states). The output of these two states is not connected to inputs of the states in the opposite direction. Through the use of two time directions, input information from the past and future information of the current time frame are used, in contrast to normal recurrent neural networks. Bidirectional recurring neural networks can be trained with similar algorithms to recurrent neural networks, since the two direction neurons do not have any interaction. If, however, back-propagation is applied, additional processes are needed, since the updating of the input and output layers cannot take place simultaneously. General methods for the training are as follows: In the forward traverse, forward states and reverse states are first traversed, then the output neurons are traversed. In the reverse traverse, the output neurons are first traversed, and then the forward and reverse states. After the forward and reverse traverses have been carried out, the weights are updated.

With the aid of the output dataset ADS of forces on the virtual object 12 determined in this way, the system 16 can determine a reaction force dataset RDS (see FIG. 1) indicative of reaction forces of the virtual object 12, and the virtual object 12 can be displaced in the virtual environment 2 in accordance with the reaction force dataset RDS, and the image data BD can be appropriately adjusted.

With the reaction force dataset RDS, the system 16 can furthermore determine the feedback dataset FDS for feedback, and transmit the feedback dataset FDS to the haptic feedback device 14.

Figure 3:
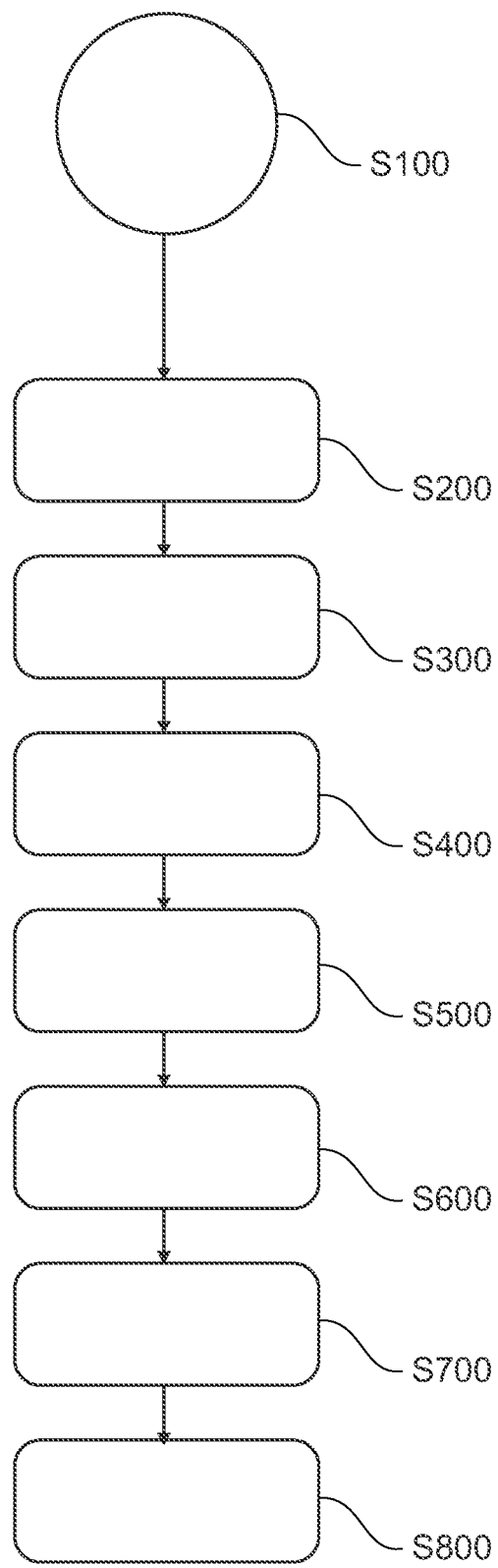
FIG. 3 shows a schematic illustration of a method flow for operation of the system shown in FIG. 2.

A process flow for the operation of the system 16 is now explained with additional reference to FIG. 3.

Before commencing its real operation, the artificial neural network 10 is in particular trained with training datasets during a training phase.

The training datasets are based on values captured with the tracking device 20. Values that are determined in the real world are thus used. The artificial neural network 10 is thus trained to replicate events in the real world. In addition, training datasets of an artificial nature, i.e., that are based on simulations, can also be used. The training datasets of an artificial nature can, for example, be based on modifications of the training datasets based on measurement data. The database for training the artificial neural network 10 can thus be broadened.

To train the artificial neural network 10—i.e., to adjust weightings of neuron connections—error back-propagation methods can be used.

The method starts in a first step S100.

In a further step S200 the hand dataset HDS representative of a shape of the real hand 8 of the user 6 is read in, i.e., input.

In a further step S300 the hand dataset HDS is applied to the trained artificial neural network 10.

In a further step S400, an output dataset ADS of forces acting on the virtual object 12 is determined with the artificial neural network 10 to which the dataset has been applied indicative of acting forces with the artificial neural network 10 to which the dataset has been applied.

In a further step S500, a reaction force dataset RDS, indicative of reaction forces of the virtual object 12, is determined.

In a further step S600 the virtual object 12 is displaced in accordance with the reaction force dataset RDS.

In a further step S700, the feedback dataset FDS for feedback is determined on the basis of the reaction force dataset RDS.

In a further step S800 the feedback dataset FDS is transmitted to the haptic feedback device 14, and feedback corresponding to the feedback dataset FDS is then output by the haptic feedback device 14.

Deviating from the present exemplary embodiment, the sequence of the steps can also be different. Multiple steps can, furthermore, also be carried out at the same time, i.e., simultaneously. Deviating again from the present exemplary embodiment, individual steps can furthermore be skipped or omitted.

The computer-implemented simulation of a virtual hand 4 in a virtual environment 2 can thus be improved.

LIST OF REFERENCE SIGNS

2 Virtual environment
4 Virtual hand
6 User
8 Real hand
10 Artificial neural network
12 Virtual object
14 Haptic feedback device
16 System
18 HMI
20 Tracking device
22a Convolutional neural network
22b Convolutional neural network
22c Convolutional neural network
22n Convolutional neural network
24a Recurrent neural network
24b Recurrent neural network
24c Recurrent neural network
24n Recurrent neural network
ADS Output dataset
FDS Feedback dataset
HDS Hand dataset
PBD Position and movement data
RDS Reaction force dataset
TA1 Partial output dataset
TA2 Partial output dataset
TA3 Partial output dataset
TAn Partial output dataset
TS1 Partial input dataset
TS2 Partial input dataset
TS3 Partial input dataset
TSn Partial input dataset
ZS1 Intermediate dataset ZS2 Intermediate dataset
ZS3 Intermediate dataset
ZSn Intermediate dataset
t1 Time point
t2 Time point
t3 Time point
tn Time point
S100 Step
S200 Step
S300 Step
S400 Step
S500 Step
S600 Step
S700 Step
S800 Step

The invention claimed is:

1. A method for simulating a virtual hand in a virtual environment, comprising:
 reading in a hand dataset that is representative of a shape of a real hand of a user;
 applying the hand dataset to a trained artificial neural network;
 determining an output dataset with the artificial neural network to which the dataset has been provided indicative of forces acting on a virtual object;
 determining a reaction force dataset with the artificial neural network to which the dataset has been provided indicative of reaction forces of the virtual object;
 displacing the virtual object in accordance with the reaction force dataset;
 determining a feedback dataset with the artificial neural network for feedback based on the reaction force dataset; and
 transmitting the feedback dataset to a haptic feedback device,
 wherein the trained artificial neural network is a bidirectional recurring neural network that connects two hidden layers in opposing directions to a same output.

2. The method of claim 1, wherein the artificial neural network is trained with training datasets based on real world measurements.

3. The method of claim 2, wherein the artificial neural network is a recurrent convolutional neural network.

4. The method of claim 1, wherein the artificial neural network includes a many-to-many architecture.

5. The method of claim 1, wherein the artificial neural network has a long short-term memory (LSTM).

6. A system, comprising:
 a human machine interface; and
 a computer programmed with an artificial neural network configured to receive as input a hand dataset that is representative of a shape of a real hand of a user, and to output an acting forces dataset indicative of forces acting on a virtual object;
 wherein the artificial neural network is further configured to determine a reaction force dataset indicative of reaction forces of a virtual object, and to displace the virtual object in accordance with the reaction force dataset; and
 wherein the artificial neural network is further configured to determine a feedback dataset for feedback based on the reaction force dataset, and to transmit the feedback dataset to a haptic feedback device, and
 wherein the trained artificial neural network is a bidirectional recurring neural network that connects two hidden layers in opposing directions to a same output.

7. The system of claim 6, wherein the artificial neural network is trained with training datasets based on real world measurement data.

8. The system of claim 6, wherein the artificial neural network is a recurrent convolutional neural network.

9. The system of claim 8, wherein the artificial neural network includes a many-to-many architecture.

10. The system of claim 9, wherein the artificial neural network has a long short-term memory (LSTM).

* * * * *